(12) United States Patent
Chang et al.

(10) Patent No.: US 6,338,078 B1
(45) Date of Patent: Jan. 8, 2002

(54) SYSTEM AND METHOD FOR SEQUENCING PACKETS FOR MULTIPROCESSOR PARALLELIZATION IN A COMPUTER NETWORK SYSTEM

(75) Inventors: Tai-chien Daisy Chang, Austin; Herman Dietrich Dierks, Jr.; Satya Prakesh Sharma, both of Round Rock, all of TX (US); Helmut Cossmann; William James Hymas, both of Heidelberg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,920

(22) Filed: Dec. 17, 1998

(51) Int. Cl.[7] .............................................. G06F 13/00
(52) U.S. Cl. ...................... 709/102; 709/105; 709/106; 712/16
(58) Field of Search ................................ 709/102, 103, 709/104, 105, 106, 223, 226, 238, 250, 321; 712/10, 16, 17

(56) References Cited

U.S. PATENT DOCUMENTS 5,826,081 A * 10/1998 Zolnowsky .................. 709/103
5,881,315 A * 3/1999 Cohen .......................... 710/52
5,991,302 A * 11/1999 Berl et al. ................... 370/400
6,182,120 B1 * 1/2001 Beaulieu et al. ............ 709/207
6,195,739 B1 * 2/2001 Wright et al. ................. 712/19

OTHER PUBLICATIONS

"Packet Resequencing Algorithm with Priority Support", IBM Technical Disclosure Bulletin, vol. 36, Issue No. 12, pp. 77–80, Dec. 1993.*

* cited by examiner

Primary Examiner—Viet D. Vu
(74) Attorney, Agent, or Firm—Robert M. Carwell

(57) ABSTRACT

Network input processing is distributed to multiple CPUs on multiprocessor systems to improve network throughput and take advantage of MP scalability. Packets received on the network are distributed to N high priority threads, wherein N is the number of CPUs on the system. N queues are provided to which the incoming packets are distributed. When one of the queues is started, one of the threads is scheduled to process packets on this queue at any one of the CPUs that is availableat the time. When all of the packets on the queue are processed, the thread becomes dormant. Packets are distributed to one of the N queues by using a hashing function based on the source MAC address, source IP address, or the packet's source and destination TCP port number, or all or a combination of the foregoing. The hashing mechanism ensures that the sequence of packets within a given communication session will be preserved. Distribution is effected by the device drivers of the system. Parallelism is thereby increased on network I/O processing, eliminating CPU bottleneck for high speed network I/Os, thereby improving network performance

27 Claims, 4 Drawing Sheets

SYSTEM AND METHOD FOR SEQUENCING PACKETS FOR MULTIPROCESSOR PARALLELIZATION IN A COMPUTER NETWORK SYSTEM

BACKGROUND OF THE INVENTION

1. Field of the Invention

This invention relates to input processing for computer networks and, more particularly, to technology for improving throughput in such systems having multiprocessor implementations.

2. Background and Related Art

In computer network systems, notably those which are UNIX (Trademark of the X/Open Systems Corporation) operating system based, network traffic from a plurality of clients and servers incoming on the net is in need of processing. This network input processing for a given network I/O device has in the past always been single threaded processing at the interrupt level whereby all inbound packets from a network device are processed sequentially. Early in the stages of computer networks this was not necessarily a significant problem.

However, with the maturation of computer technology, it becoming more commonplace to encounter computer network systems involving a number of CPUs present on the system, (being referred to in the art as multiprocessor or "MP" systems). The weakness of single threaded processing, as MP systems, has now become apparent due to bottlenecks caused by this single thread processing. In the past, with single CPU systems this bottleneck was not of as much visibility. However, as noted with the advent of MP systems, Internet servers have grown bigger and faster with multiple CPUs, with 8-way and 12-way CPU systems (e.g., including 8, 12, or more CPUs) becoming more and more commonplace. The inherent weakness of this single thread processing mode is that the aforementioned network input, in accordance with prior art technology, is processed only by the single CPU at any given time regardless of the number of CPUs on the system available for such processing.

A system and method was thus highly desired, given this maturation of computer network technology into MP systems, whereby such network input processing could take better advantage of the MP scalability so as to improve network throughput on the larger network servers.

In an effort to address this problem, various systems have been developed employing differing techniques for queuing inbound packets. However, such systems nevertheless suffered from very serious drawbacks. First, they were not tied to MP scalability. Still further, they did not address the problem of out-of-order packets caused by distributing the incoming packets to multiple parallel processing nodes.

Queuing is a method which has long been known for seeking to parallelize processing in order to increase throughput and distribute workloads. However, a serious problem with this in the context of the instant invention is that in accordance with such conventional queuing, one of a multiple of CPUs could in fact obtain a packet from the queue for processing, however there was no assurance that with such multiple processors obtaining packets in this manner that the packet order would be maintained. It is extremely important that this order be maintained when the packets arrive at sockets. Once systems expanded to more than one CPU to process packets for throughput and concurrency, loss of control of scheduling the packets in their order occurred in previous systems. While this in and of itself was not fatal to operation of multiprocessor systems employing queues, once packets are out of order and flowing up to an endpoint of the system, additional resources must be expended in order to process and correctly resequence these packets in the protocol stack. This additional processing in order to ensure correct packet sequencing in itself is time consuming so as to result in little net gain otherwise affordable by employing queues, multiple CPUs and parallelization in the first place.

One practical problem resulting from the inability to provide for network input distributed processing is that throughput of an individual CPU on the order of 100 megabits per second is less than that of network adapter cards which may nominally have throughputs of one gigabyte per second, e.g., operating at a 10× factor faster than the CPU. In accordance with conventional prior practice, wherein no more than one CPU at a time could be processing packets associated with one of the network I/O devices, the net result of this was that network throughput was thus CPU bound, e.g., throughput could not exceed the capacity of a single CPU running interrupts and processing incoming packets from a single given physical interface. In other words, network throughput was CPU bound, even in MP systems. Thus it became increasingly difficult to justify to potential customers of MP systems why they should invest significant amounts of money for these systems without enjoying a concomitant gain in performance. Similarly, it became increasingly difficult to justify making the case that a customer should invest in faster and more expensive network adapter cards (which, as noted, may in some instances have a capability 10× faster than the CPUs themselves) when, upon installing such an adapter, the customer still does not see a 10× performance increase (due to the aforementioned bottleneck caused because only a single CPU is servicing an input or interrupt notwithstanding the presence of other processors with concurrent processing capability). Thus there was a need to demonstrate to the customer improvements in system performance to justify the associated cost of adding additional CPUs in MP systems and more expensive adapter cards.

Thus, although queuing inbound packets was known, these prior efforts were not tied to MP scalability and such efforts did not address the aforementioned problem of out-of-order packets. It will be appreciated that this is a key shortcoming of prior art attempts to solve the problem of distributing random input to multiple engines while nevertheless maintaining the important input sequence for the upper layer protocol (mainly TCP/IP) to work properly. As previously noted, these out-of-order packets cause severe performance problems for such protocols as TCP or UDP due in part to the overhead associated with sorting out the proper packet sequences.

SUMMARY OF THE INVENTION

Network input processing is distributed to multiple CPUs on multiprocessor systems to improve network throughput and take advantage of MP scalability. Packets received on the network are distributed to N high priority threads, wherein N is the number of CPUs on the system. N queues are provided to which the incoming packets are distributed. When one of the queues is started, one of the threads is scheduled to process packets on this queue. When all of the packets on the queue are processed, the thread becomes dormant. Packets are distributed to one of the N queues by using a hashing function based on the source MAC address, source IP address, or the packet's source and destination TCP port number, or all or a combination of the foregoing.

The hashing mechanism ensures that the sequence of packets within a given communication session will be preserved. Distribution is effected by the device drivers of the system Parallelism is thereby increased on network I/O processing, eliminating CPU bottleneck for high speed network I/Os, thereby improving network performance.

DETAILED DESCRIPTION

Figure 1:
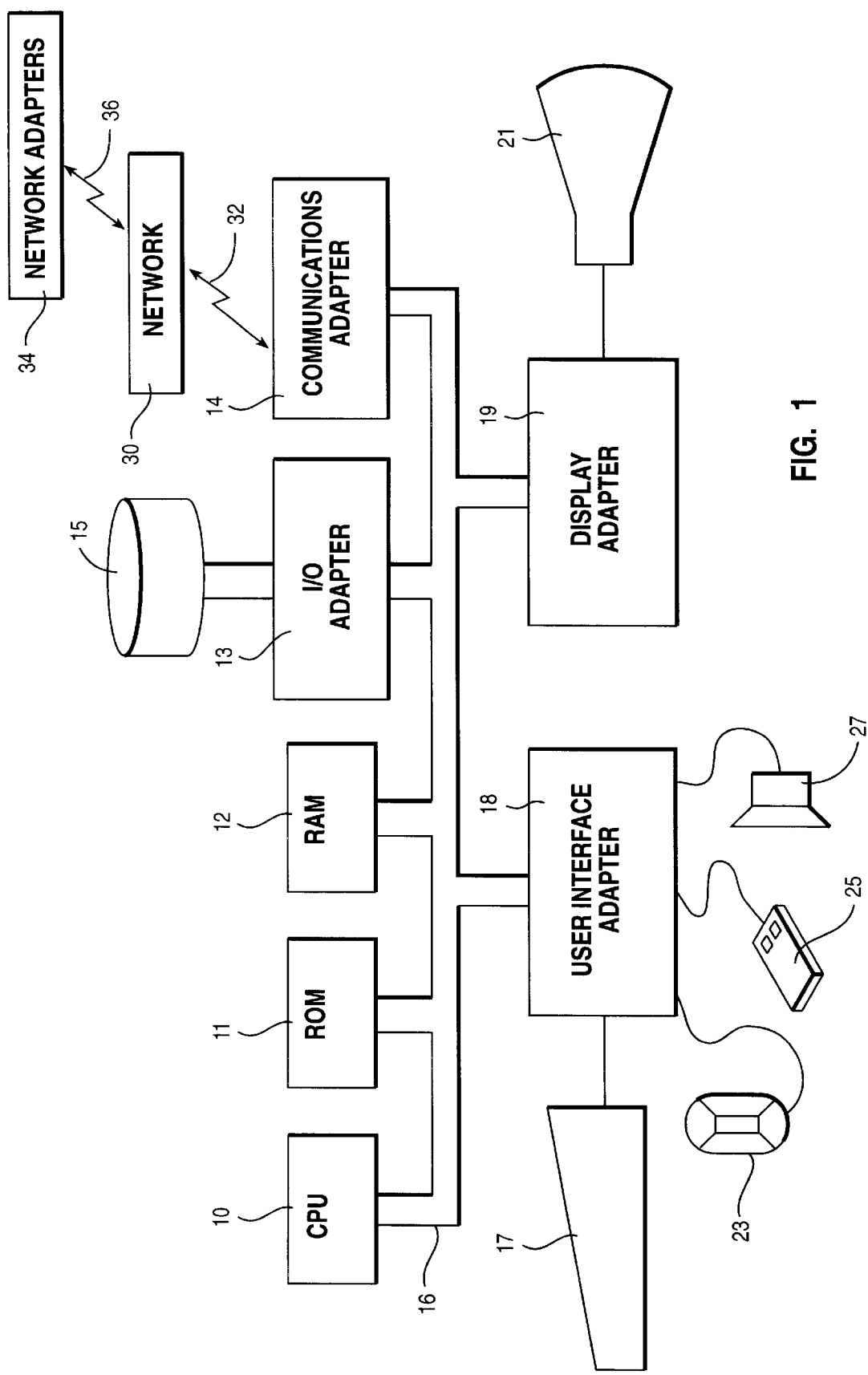
FIG. 1 is a functional block diagram of a server or client machine of a computer network in which the invention may be advantageously employed.

FIG. 1 illustrates a preferred embodiment of a computer system which may advantageously employ the improved packet sequencing system of the present invention. The system of FIG. 1 may be seen to represent clients or servers depicted in FIGS. 2 and 3. Such systems are interconnected by means of links 32 to networks 30 shown in FIGS. 2 and 3 which, in turn, are connected by link 36 to appropriate network adapters 34. The system comprises a CPU 10, read only memory (ROM) 11, random access memory (RAM) 12, I/O adapter 13, user interface adapter 18, communications adapter 14, and display adapter 19, all interconnected via a common address/data and control path or bus 16. Each of the above components accesses the common bus utilizing conventional techniques known to those of ordinary skill in the art, and includes such methods as dedicating particular address ranges to each component in the system, with the CPU 10 being the busmaster. As is further shown in FIG. 1, these external devices such as DASD 15 interface to a common bus 16 through respective adapters such as I/O adapter 13. Other external devices, such as the display 21, similarly use their respective adapter such as display adapter 19 to provide data flow between the bus 16 and the display 21 or other device. Various user interface means are provided for interconnection and use with the user interface adapter 18, which, in the figure has attached thereto representative user input devices such as joy stick 23, mouse 25, keyboard 17, and speaker and/or microphone 27. The system is further provided with a conventional operating system 29 adapted to execute one or more applications 31. Each of these units is well known in as such and accordingly will not be described herein.

The invention admits to implementation on essentially any computer systems and corresponding microprocessors, such as the RS/6000 (™), RISC-based workstations and personal computers of the IBM Corporation executing the AIX (™) and OS/2 (™) operating systems, respectively, or similar machines of other vendors, which include for example in the case of an RS/6000 workstation a 604 PowerPC (™) RISC chip. (RS/6000, IBM, AIX, OS/2 and PowerPC are trademarks of the IBM Corporation).

Contained with the CPU 10 of FIG. 1, typically is one or more microprocessors which performs the system address, data, and control processing functions necessary for correct operation of the system of FIG. 1. Although the invention admits to application to various microprocessor designs, in the embodiment disclosed herein, the microprocessor takes the form of a PowerPC 604 microprocessor manufactured by the IBM Corporation, which is a species of microprocessor known as a reduced instruction set computer (RISC) microprocessor. Further details regarding the architecture and operation of such a microprocessor may be obtained from the PowerPC 604 RISC Microprocessor Users Manual, Document #MPC604UM/AD, November, 1994, copyright IBM Corporation, which is incorporated herein by reference.

In the context of the invention, the user will view various objects such as a cursor and pop up or pop down menus on the display 21 which may be manipulated by means of various pointing devices such as the mouse 25 and voice activated navigation. Program code associated with the user interface adapter 18 by way of a device driver for the pointing device 25 and microphone 27 in conjunction with operating environment and application code resident in RAM 12 and/or DASD 15 will facilitate and enable movement of a cursor on the display screen 21 responsive to and in association with correlative voice commands spoken into microphone 27.

Figure 2:
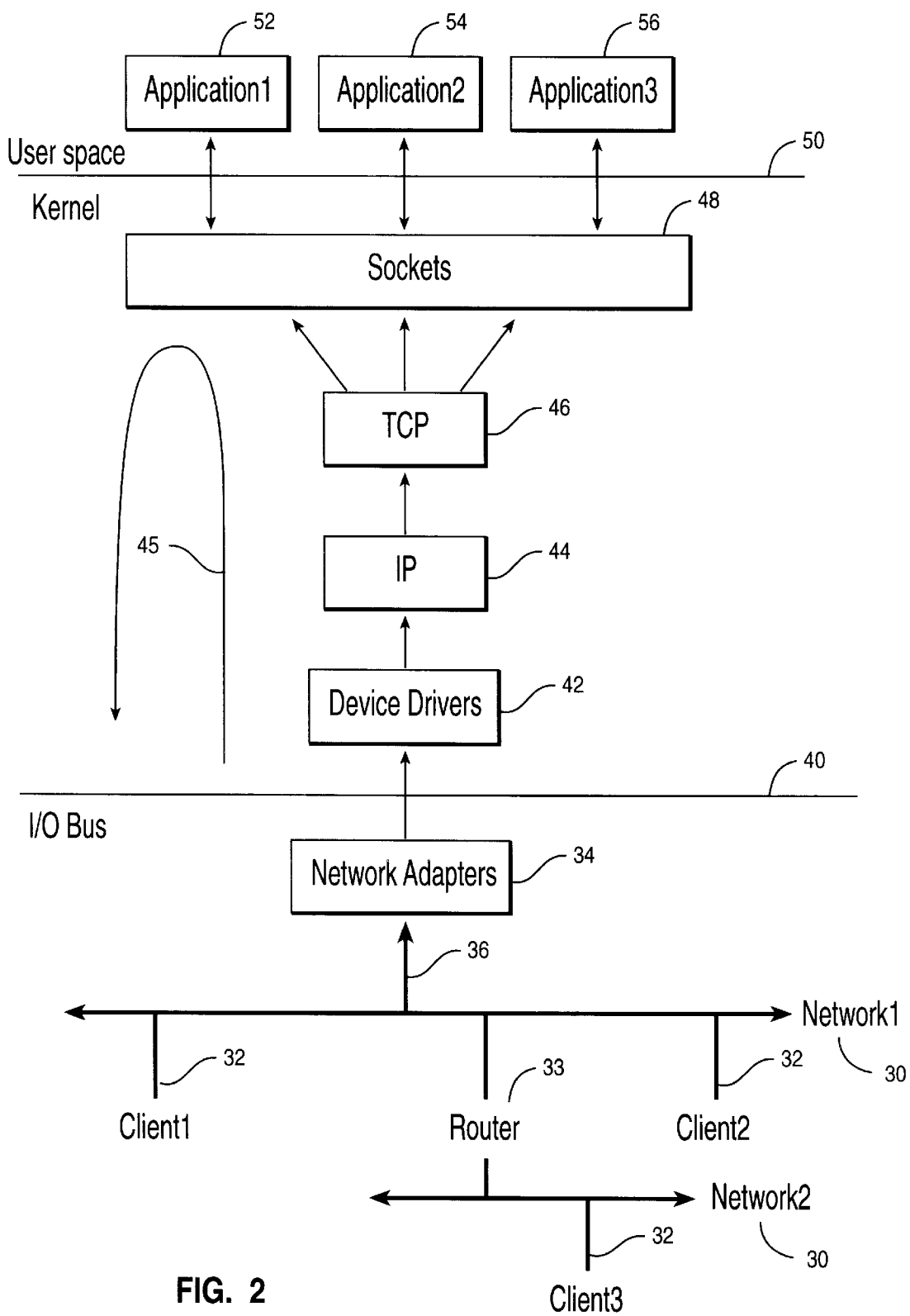
FIG. 2 is a system architecture functional block diagram of a prior art computer network illustrating single thread processing at the interrupt level and sequential inbound packet processing.

Turning now to FIG. 2, depicted therein is an architectural illustration of a typical computer network system known in the art. A plurality of client machines 32 are interconnected to networks 30 with such networks in turn being connected in a manner well known in the art as required by means of various routers 33. The network 30, in turn, will conventionally be interconnected to a plurality of network adapters 34 as shown by the connection 36 which are operating on an I/O bus 40, also well known in the art.

Also associated with these network adapters 34 are a plurality of device drivers 42 for processing incoming packets. These device drivers 42 in turn condition the incoming packets so as to be received and processed in accordance with a conventional TCP/IP protocol, and accordingly the packets will include network packet header information consistent with this protocol as detailed in FIG. 4. The incoming packets will, in accordance with such protocol be processed through the various layers of the TCP/IP protocol—specifically the Internet protocol (IP) 44, followed by the transfer control protocol (TCP) layer 46, whereupon these packets are then distributed in accordance with the addresses associated therewith (shown in FIG. 4) to corresponding ones of a plurality of sockets 48. It would be appreciated that these TCP/IP and socket layers comprise a portion of the kernel of the server operating system which may be the UNIX (™), orAIX (Trademark of IBM Corporation), system or other derivative operating systems of UNIX or any other correlative operating system as desired. These sockets 48, in turn, will be interconnected to a plurality of corresponding applications 52, 54, 56, residing in the user space and interconnected across the user space/kernel boundary 50 in the manner shown in FIG. 2.

One important feature or, more precisely, drawback of the thus-described networking system architecture in FIG. 2 must be pointed out. It will be noted that in accordance with prior art practice, processing of incoming packets on the I/O bus 40 will experience single thread processing well known in the art at the interrupt level. What this means is that all inbound packets from a network device such as the network adapters 34 will be processed sequentially as they proceed through the various layers of the TCP/IP protocol. This may be seen schematically illustrated by means of the single arrow 45, symbolizing such sequential single thread processing through the various layers of the server kernel.

Figure 3:
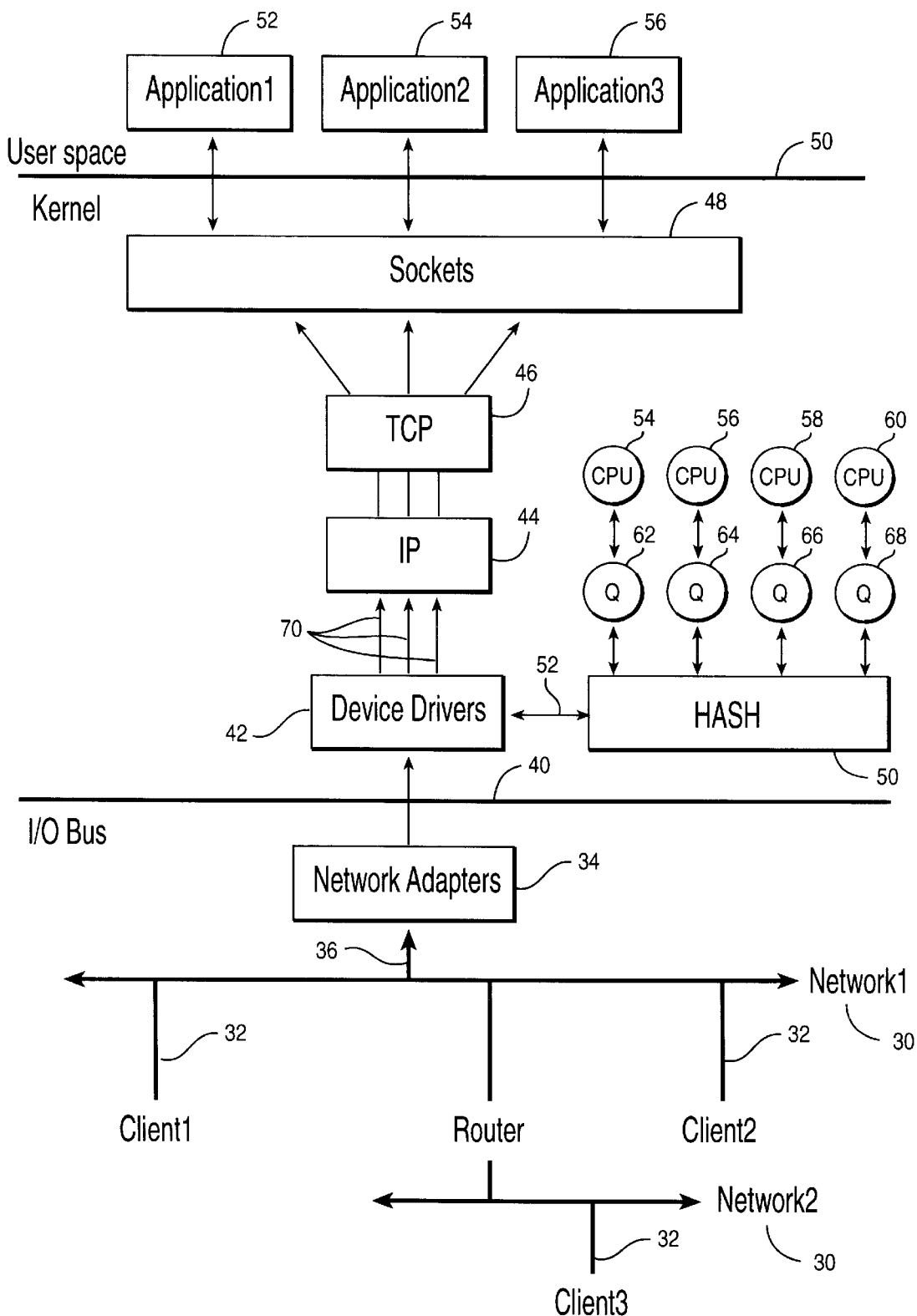
FIG. 3 is another functional block diagram of the system architecture of a computer network illustrating concurrent processing by multiple threads of IP queues in a multiprocessor system in accordance with the invention.

Turning now to FIG. 3, depicted therein is a system architecture illustration similar to that of FIG. 2 but incorporating several important differences which give rise to the increased throughput provided by the invention. First, some general discussion will be provided of how this objective is accomplished, followed by a more detailed description of a representative modification of the system architecture of FIG. 2 shown in FIG. 3 for accomplishing this end. It will be recalled that one objective of the invention is to provide more concurrency by employing the MP feature of modern network systems whereby multiple CPUs can simultaneously process more packets per second—such an objective being accomplished by queuing the packets in the device drivers 42.

More particularly, as will be hereinafter described in greater detail, every inbound packet will be queued onto an IP queue by hashing, wherein the number of IP queues will equal the number of CPUs in the MP system. Unlike the situation with reference to FIG. 2 wherein only single thread processing transpires, resulting in sequential processing of inbound packets, in accordance with the invention depicted in FIG. 3, this IP queue is concurrently processed by multiple threads with one thread per CPU, and one queue per thread. In this manner the path length is shortened with more CPUs running parts of a packet's code simultaneously in a multithread fashion, thereby effecting the increased throughput.

It will be recalled that in accordance with prior art practice associated with the system of FIG. 2, incoming packets on the network 30 will each generate an interrupt. Conventionally, when the system of FIG. 2 thus receives an interrupt, the single CPU of the system is thus interrupted and will begin handling the incoming packets. When the CPU is through processing all packets, the interrupt handling has been completed, and the CPU returns to a normal context level. The practical import of this is that during the entire interrupt handling period, the interrupted CPU will only be looking at handling and processing each particular data packet, either responding to it or handing it off to another processor until such processing is complete. During this interrupt period, however, no other processor can assist a processor handling an interrupt and its associated tasks, e.g., these other processors cannot be doing anything relative to the tasks of the CPU handling a given interrupt and its packets. Also, the interrupt will mask off all other activities that the interrupted CPU could otherwise be handling while the packet is being processed, e.g., normal time slice scheduling and handling of any other user applications. Even as more CPUs are added to the system in the prior art when an interrupt comes in, nevertheless only a single CPU will obtain the interrupt and start processing it. Even with these additional CPUs, all concurrently processing, if any one CPU obtains an interrupt from a network device 34, only traditional single thread processing transpires wherein inbound packets from the device are processed sequentially by the single CPU. During this period, assistance from the remaining CPUs which may have available processing power, is effectively paralyzed such that these supplemental CPUs cannot perform meaningful work on these packets until conventional interrupt processing is completed of this single thread processing at the interrupt level. The remaining CPUs may be performing meaningful work, but only one of them will be processing the packets associated with the interrupt and the particular network device and will be exclusively tied up with such processing without assistance from the other CPUs.

Turning now to FIG. 3 in more detail, however, in contrast, in accordance with the invention, in order to improve this network throughput by employing more efficiently these additional CPUs in an MP system, an important concept of the invention is to distribute the interrupt workload amongst all of the CPUs. As previously noted, prior systems might employ queuing inbound packets but these systems did not address scalability nor did they provide solutions to out-of-order packets. As previously described, this packet order must be maintained, because out-of-order packets cause severe performance problems and the important input sequence must be maintained for the upper layer protocol such as the protocol stack depicted in FIG. 4 to work properly. There is a "fastpath" architected through conventional TCP/IP layers, but in order to enjoy the benefits thereof, this fastpath depends upon packets arriving in the proper sequence.

Techniques exist for ensuring packets being received from a client are sequenced properly regardless of whether in the conventional TCP/IP or other network protocol form. The subject invention applies this sequencing in the context of improved parallelization of multiple CPUs in a network system. Thus, referring to FIG. 3 in greater detail, additional functionality is provided, extended from the driver to a queuing mechanism which runs on multiple threads. These queues may be seen at reference numeral 62, 64, 66, 68 with, in a multithreaded fashion, a plurality of different CPU engines schematically depicted by CPUs 54, 56, 58, 60 of an MP system running on them. The invention provides a sequencing to the packets received by the device drivers 42 so that as they proceed through the protocol stacks of FIG. 4 they arrive in sequence. In the FIG. 3, the number of queues 62–68 provided, equal the number of CPUs 54–60 so that these multiple CPUs can be simultaneously working to process packets.

As in conventional systems, each packet has its own unique address. In one implementation of the invention, advantage is taken of the fact that media access control (MAC) addresses may be utilized for this hashing and sequencing as in the familiar Ethernet. Each network interface card (NIC) conventionally may have, for example, a 24 bit MAC, with each packet associated therewith having a like MAC address. It is a feature of the invention to hash, in accordance with the hash function 50 shown in FIG. 3, each of these MACS into the aforementioned plurality of queues 62–68, whereby a hash provided by the hash function 50 to packets in the device drivers 42 by means of the interconnection 52 will occur for given devices to the network so that packets associated with a given device will be handled in the same particular queue. Therefore no matter which CPU 54–60 handles a particular queue, the packets associated with a particular device will flow to one of the applications 52–56 in sequence.

Figure 4:
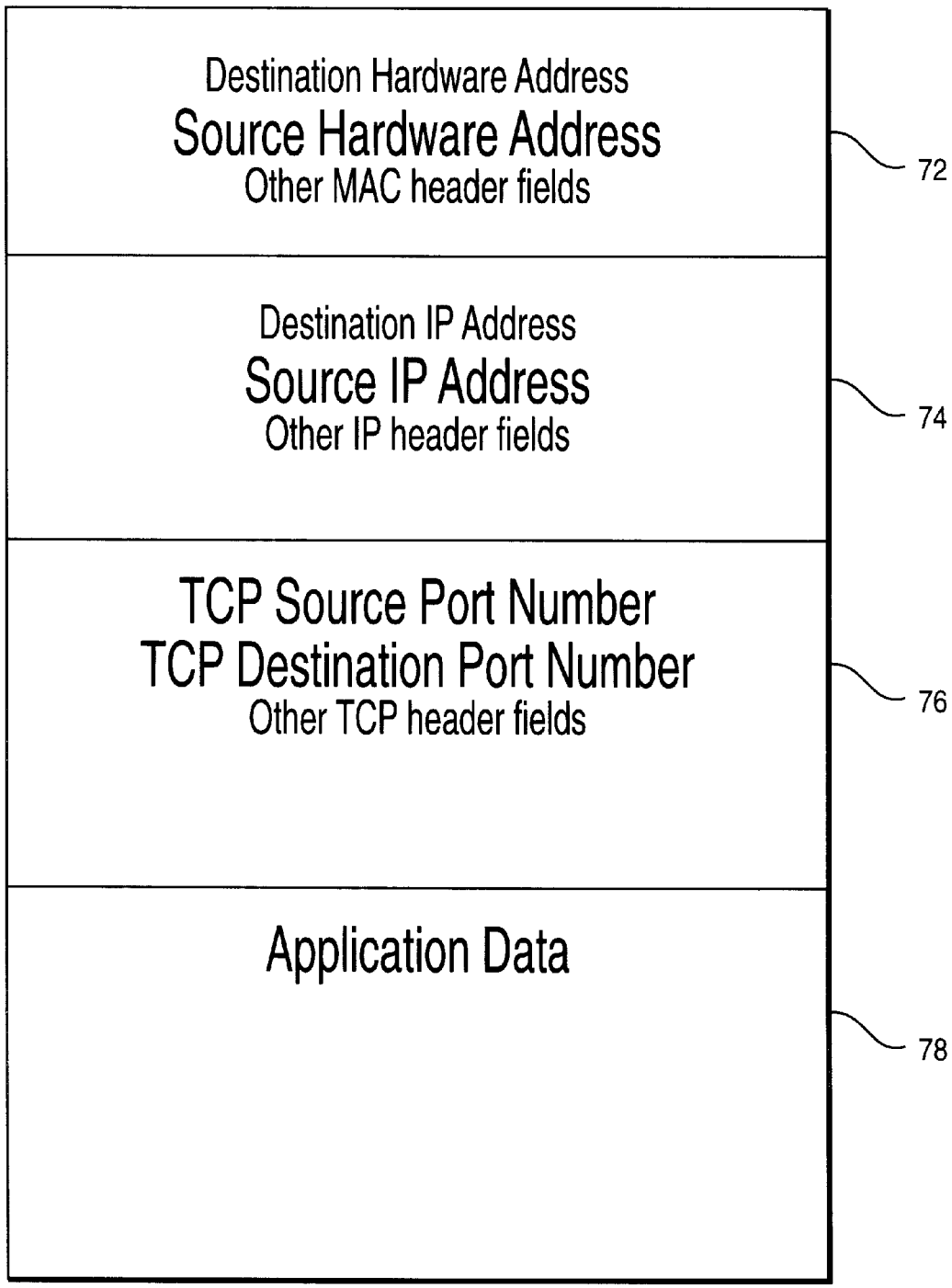
FIG. 4 is an illustration of a representative network packet header for the TCP/IP protocol illustrating different hierarchical layers which may be used to ensure correct packet sequencing for distributed packets in the queues.

Turning now to FIG. 4. Depicted therein is a representative protocol stack advantageously employed in a manner to be hereinafter described in the invention, such network packet header being for the familiar TCP/IP protocol. As is well known in the art, such a protocol is conventionally comprised of a plurality of layers, the first of which is a data link layer 72 which includes the previously described MAC header fields. Additionally included is the source hardware address which identifies the particular I/O device such as a NIC with particularity. This in turn is followed by a network layer 74 which includes a source IP address and various IP headers. Next, a transport layer 76 is provided which includes TCP source and destination port numbers. This stack is then completed with application data 78 corresponding to the applications 52–56 of FIG. 3.

Although the MAC was described as being employable to affect the sequencing of packets in one embodiment of the invention, the invention is not intended to be so limited and admits to other mechanisms employing differing components of the protocol stack of FIG. 4. Thus, for example, it is specifically contemplated to employ a combination of addresses just described resident in a typical protocol stack.

One reason for a different approach other than employing the MAC address alone is as follows. In a given network system a gateway box may be employed and a router which may have thousands of clients on the other side of the router. However packets will appear as originating from a single MAC address. Accordingly, in the previously described embodiment the desired benefit of distribution of packets amongst queues and CPUs cannot in this instance be enjoyed inasmuch as if the MAC address alone is employed, all packets will be routed to the same queue. However, upon recognizing that all clients have unique IP addresses 74, this fact may be advantageously employed to avoid the aforementioned problem. Thus, it is specifically contemplated that in routing packets to appropriate queues 62–68, employing the hashing function 50, that a combination of MAC addresses 72 and IP addresses 74 may be employed to further distribute the workload of processing the packets.

In still a third case, instances may arise when the number of clients is not large as in the previously described case but rather is a single large client or small number of large clients. There may be many different applications running on a particular client. If just the IP address is employed, again the result essentially is only one client resulting in the undesirable affect of not maximizing distribution of packets amongst the queues. In this instance the invention specifically contemplates advantageously employing the port numbers 76 since each such application will conventionally be associated with a particular TCP port number. By thus employing port numbers, the system may again more uniformly distribute packets in the queues to thereby obtain the parallelization of processing power in packet handling amongst the multiple CPUs on the server, as is a desired objective of the invention. The sequence of packets may thereby be maintained between two applications.

In summary, it is contemplated that a hierarchy of addresses in the protocol stack of FIG. 4 may be employed to effect the desired queuing and parallelization, namely employing in the first instance the MAC addresses 72, next the IP addresses 74, and finally the application port addresses or number 76 alone or in combination. The queuing and hashing in FIG. 3 is carried out by the drivers 42.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method for distributed processing of network packets in a multiprocessor system having a plurality of central processing units (CPUs) comprising:
   distributing said packets to said CPUs with a hashing function;
   processing said packets with said CPUs; and
   delivering said packets to a protocol stack in sequence.

2. The method of claim 1 wherein said distributing comprises:
   distributing said packets to N threads.

3. The method of claim 2 wherein said distributing further comprises:
   forming N queues receiving said N threads.

4. The method of claim 3 wherein N is the number of said CPUs in said system.

5. The method of claim 4 wherein said hashing function uses a source MAC address, source ip address, or source and destination TCP port number.

6. The method of claim 4 wherein said hashing function uses at least two in a combination of a source MAC address, source IP address and/or source and destination TC port number.

7. The method of claim 4 wherein said system includes a plurality of device drivers and said distributing is by said device drivers.

8. The method of claim 4 wherein said each of said CPUs processes a different one of said threads associated with a different one of said queues.

9. The method of claim 4 wherein said threads are high priority threads, and are dormant after said processing.

10. An apparatus for distributed processing of network packets in a multiprocessor system having a plurality of central processing units (CPUs) comprising:
    means for distributing said packets to said CPUs with a hashing function;
    means for processing said packets with said CPUs; and
    means for delivering said packets to a protocol stack in sequence.

11. The apparatus of claim 10 wherein said means for distributing comprises:
    means for distributing said packets to N threads.

12. The apparatus of claim 11 wherein said means for distributing further comprises:
    means for forming N queues receiving said N threads.

13. The apparatus of claim 12 wherein N is the number of said CPUs in said system.

14. The apparatus of claim 13 wherein said hashing function uses a source MAC address, source IP address, or source and destination TCP port number.

15. The apparatus of claim 13 wherein said hashing function uses at least two in combination of a source MAC address, source IP address and/or source and destination TC port number.

16. The apparatus of claim 13 wherein said system includes a plurality of device drivers and said distributing is by said device drivers.

17. The apparatus of claim 13 wherein each of said CPUs processes a different one of said threads associated with a different one of said queues.

18. The apparatus of claim 13 wherein said threads are high priority threads, and are dormant after said processing.

19. A computer program product having program code means usable by a computer system for distributed processing of network packets in a multiprocessor system having a plurality of (CPUs), said computer program product comprising:
    program code means for distributing said packets to said CPUs with a hashing function;
    program code means for processing said packets with said CPUs; and
    program code means for delivering said packets to a protocol stack in sequence.

20. The computer program product code of claim 19 wherein said program code means for distributing comprises:
    program code means for distributing said packets to N threads.

21. The computer program product of claim 20 wherein said program code means for distributing further comprises:
   program code means for forming N queues receiving said N threads.

22. The program product code of claim 21 wherein N is the number of said CPUs in said system.

23. The program product code of claim 22 wherein said hashing function uses a source MAC address, source IP address, or source and destination TCP port number.

24. The program product code of claim 22 wherein said hashing function uses at least two in combination of a source MAC address, source IP address and/or source and destination TC port number.

25. The program product code of claim 22 wherein said system includes a plurality of device drivers and said distributing is by said device drivers.

26. The program product code of claim 22 wherein each of said CPUs processes a different one of said threads associated with a different one of said queues.

27. The program product code of claim 22 wherein said threads are high priority threads, and are dormant after said processing.

* * * * *